(12) United States Patent
Kiernan-Lewis

(10) Patent No.: US 10,718,997 B2
(45) Date of Patent: Jul. 21, 2020

(54) MODULAR TRIPOD-ARM

(71) Applicant: John Kiernan-Lewis, Irvine, CA (US)

(72) Inventor: John Kiernan-Lewis, Irvine, CA (US)

( * ) Notice: Subject to any disclaimer, the term of this patent is extended or adjusted under 35 U.S.C. 154(b) by 0 days.

(21) Appl. No.: 16/250,468

(22) Filed: Jan. 17, 2019

(65) Prior Publication Data
US 2019/0146312 A1    May 16, 2019

(51) Int. Cl.
| | | |
|---|---|---|
| G03B 17/00 | (2006.01) | |
| G03B 17/56 | (2006.01) | |
| F16M 11/20 | (2006.01) | |
| F16M 11/24 | (2006.01) | |
| F16M 13/02 | (2006.01) | |
| F16M 11/16 | (2006.01) | |
| F16M 11/10 | (2006.01) | |
| F16M 13/00 | (2006.01) | |
| F16M 13/04 | (2006.01) | |

(52) U.S. Cl.
CPC .......... *G03B 17/561* (2013.01); *F16M 11/10* (2013.01); *F16M 11/16* (2013.01); *F16M 11/2021* (2013.01); *F16M 11/2042* (2013.01); *F16M 11/24* (2013.01); *F16M 11/242* (2013.01); *F16M 13/00* (2013.01); *F16M 13/022* (2013.01); *F16M 13/04* (2013.01); *F16M 2200/024* (2013.01)

(58) Field of Classification Search
USPC ........................................................ 396/428
See application file for complete search history.

(56) References Cited

U.S. PATENT DOCUMENTS

| | | | |
|---|---|---|---|
| 3,921,947 A | 11/1975 | Adam | |
| 4,317,552 A | 3/1982 | Weidler | |
| 4,733,259 A | 3/1988 | Ng | |
| 5,043,750 A | 8/1991 | Yamaguchi | |
| 5,275,364 A * | 1/1994 | Burger | F16L 3/00 248/125.1 |
| 5,647,565 A | 7/1997 | Wei | |
| 5,772,164 A | 6/1998 | Shen | |
| 5,826,121 A * | 10/1998 | Cardellini | F16M 11/16 396/428 |
| 6,068,224 A | 5/2000 | Horiuchi | |
| 6,375,135 B1 | 4/2002 | Eason | |
| 6,767,153 B1 * | 7/2004 | Holbrook | F16C 11/0604 403/115 |
| 7,367,617 B1 | 5/2008 | Bond | |
| 7,494,291 B2 | 2/2009 | Saxton | |
| 7,891,615 B2 * | 2/2011 | Bevirt | F16M 11/40 248/163.1 |
| 7,905,667 B2 | 3/2011 | Barker | |
| 8,322,665 B2 | 12/2012 | Palik | |
| 8,620,152 B1 | 12/2013 | Martin | |
| D782,464 S | 3/2017 | Chung | |
| 9,612,507 B2 | 4/2017 | Woodman | |
| 9,687,065 B2 | 6/2017 | Hwang | |
| 10,012,465 B1 * | 7/2018 | Liechty | F41A 23/10 |

(Continued)

*Primary Examiner* — Rodney E Fuller

(57) ABSTRACT

A tripod with modular arm segments capable of coupling with each other. The three arm segments may simultaneously attach with a mount to form a tripod. Ends of the arm segments are coupling elements. Two of the arm segments may detach from the plate and couple with the arm segment remaining coupled to form an articulating extension arm for the mount.

8 Claims, 9 Drawing Sheets

(56) References Cited

U.S. PATENT DOCUMENTS

| | | | |
|---|---|---|---|
| 2006/0291951 A1* | 12/2006 | Van Zile, III | B25J 15/0052 |
| | | | 403/97 |
| 2007/0079541 A1* | 4/2007 | Peterson | F41A 23/08 |
| | | | 42/94 |
| 2008/0093516 A1* | 4/2008 | Bevirt | F16M 11/40 |
| | | | 248/181.1 |
| 2008/0117328 A1 | 5/2008 | Daoud | |
| 2008/0283697 A1* | 11/2008 | Darrow | B60R 11/02 |
| | | | 248/163.1 |
| 2010/0038498 A1* | 2/2010 | Enos | F16M 11/16 |
| | | | 248/163.2 |
| 2012/0138763 A1* | 6/2012 | Russell | F16M 11/242 |
| | | | 248/310 |
| 2013/0026315 A1 | 1/2013 | Lee | |
| 2013/0026327 A1* | 1/2013 | Sauret | F16M 11/2042 |
| | | | 248/420 |
| 2015/0056002 A1 | 2/2015 | Olds | |
| 2016/0041454 A1* | 2/2016 | McElderry | G03B 17/566 |
| | | | 396/428 |
| 2017/0198857 A1* | 7/2017 | Thomas | H02S 20/30 |
| 2018/0003337 A1* | 1/2018 | Migliori | F16M 11/14 |
| 2018/0106418 A1 | 4/2018 | Anglin | |

* cited by examiner

MODULAR TRIPOD-ARM

BACKGROUND

Portable tripods have been used to stably mount cameras, surveying instruments, and other devices for many years. A mount typically serves as the co-terminus of three tripod legs. The mount can couple a camera or other device. The three legs may be adjustable by hinging, telescoping, or by other method. In photography, tripods are used for long exposure, panoramic, portrait, and other shots where the camera must be stably positioned.

Extension arms, including selfie-sticks, allow a user to mount and extend the camera to vantage points a photographer could not otherwise achieve by handheld photography. A handle and device mounting means comprise the respective ends of the extension arm. The use of such extension arm permits a user to securely grip the camera and film themselves while active. Extension arms with multiple arm segments may permit telescoping or articulation of the mount relative to the handle.

Photographers may want to capture both images requiring the stability of a tripod and the mobility of an extension arm. Devices exist which attempt to provide both tripod and extension arm functionality. Such devices may provide a tripod stand within the extension arm, allowing the arm to serve as the storage container for the tripod legs. These devices require a duplication of parts to function as both a tripod and extension arm. Such devices also limit the size and structure of the tripod legs, as all three legs must fit within one arm segment. This forces tripod legs to be shorter and narrower than is required to provide a stable base in many environments. Some tripods may provide articulating leg segments. But the leg segments are not modular with the ability to couple with the other leg segments to form an extension arm.

The current invention provides three arm segments capable of functioning as both tripod legs and an adjustable extension arm. The arm segments may be detached from the mount. The arm segments can couple to form articulating joints. The room necessary to store and transport a device with tripod and extension arm functionality is dramatically decreased over separate devices providing the two functionalities. Conversion from a tripod configuration to an extension arm configuration only requires removal of two arm segments and the coupling of those arm segments together.

SUMMARY

Three arm segments contain coupling elements at each end. In the exemplary embodiment there is a male coupling element and female coupling element on each arm segment. The male coupling elements are interchangeable. The female coupling elements are interchangeable and capable of engaging and coupling with the male coupling element on the other arm segments. The arm coupling elements form a joint when coupled.

A mount is configured as device coupling means. The mount has three base coupling elements. The base coupling elements are capable of actively coupling with the arm segment coupling elements. The three legs are coupled with the three base coupling aspects to form a tripod configuration. The base coupling element and leg coupling element form a joint when coupled. The joint allows movement of the arm segment relative to the mount.

The tripod configuration is converted to an articulating arm configuration by first detaching two of the arm segments. The first detached arm segment couples with the free coupling element of the arm segment remaining coupled with the mount. The second detached arm segment couples with the free coupling element of the first detached arm segment. The arm segment coupling elements form joints permitting movement of the coupled arm segments relative to each other.

The mount may be capable of coupling a device directly or may couple an auxiliary device with device coupling means.

DRAWING NUMERALS

12 Modular Tripod-Arm
14 Tripod Configuration
16 Arm Configuration
18 Adjustment position
20 Locked position
22 First Leg Segment
24 Second Leg Segment
26 Third Leg Segment
32 Mount
34 Receptacle
36 Plate
42 Base Joint
44 First Joint
46 Second Joint
244 Male Coupling Element
248 Female Coupling Element
250 Foot
262 Serrated Faces
264 Thumb Screw
265 Threaded socket
266 Threaded aspect
267 Knob
322 Sidewalls
344 Base Coupling Element
388 Plate Screw
390 ¼" 20 screw

DESCRIPTION OF THE DRAWINGS

Figure 1:
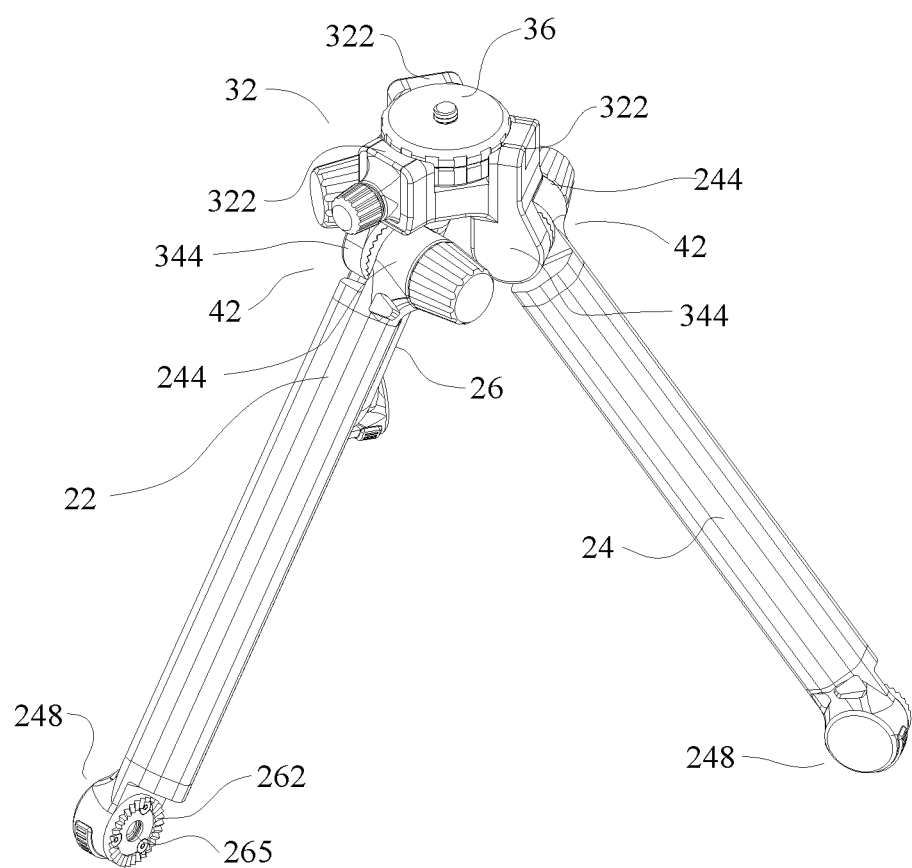
FIG. 1 is a perspective view of the modular tripod in a tripod configuration.
Figure 2:
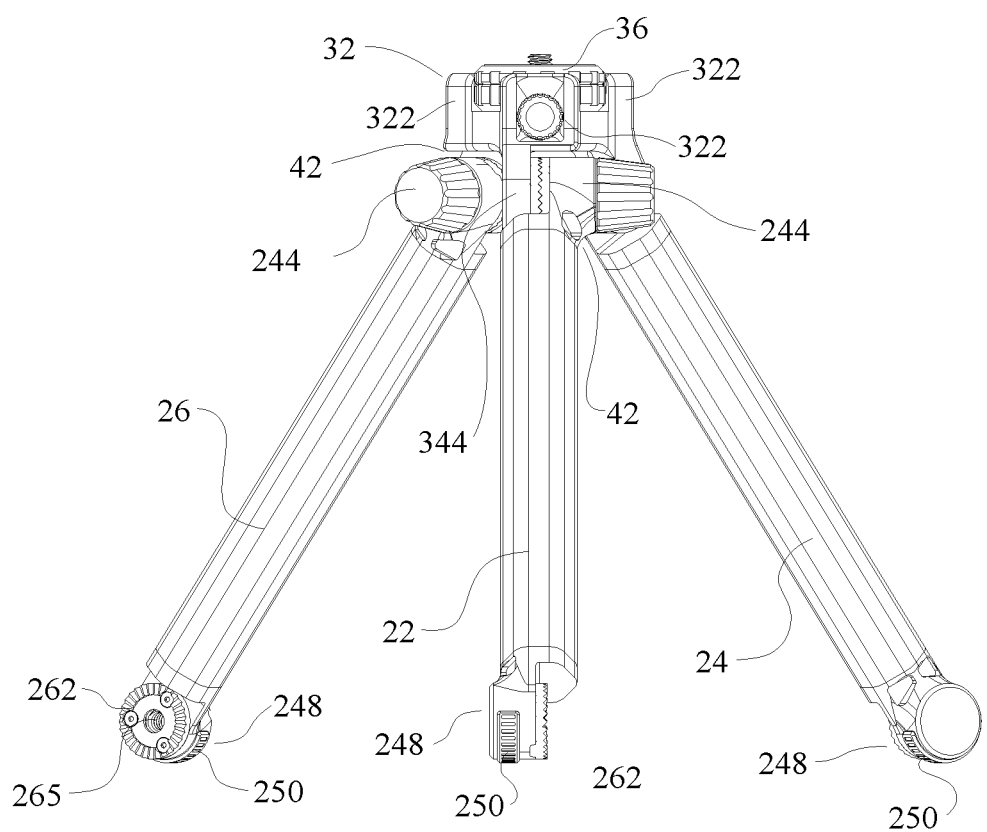
FIG. 2 is a side view of a tripod configuration.
Figure 3:
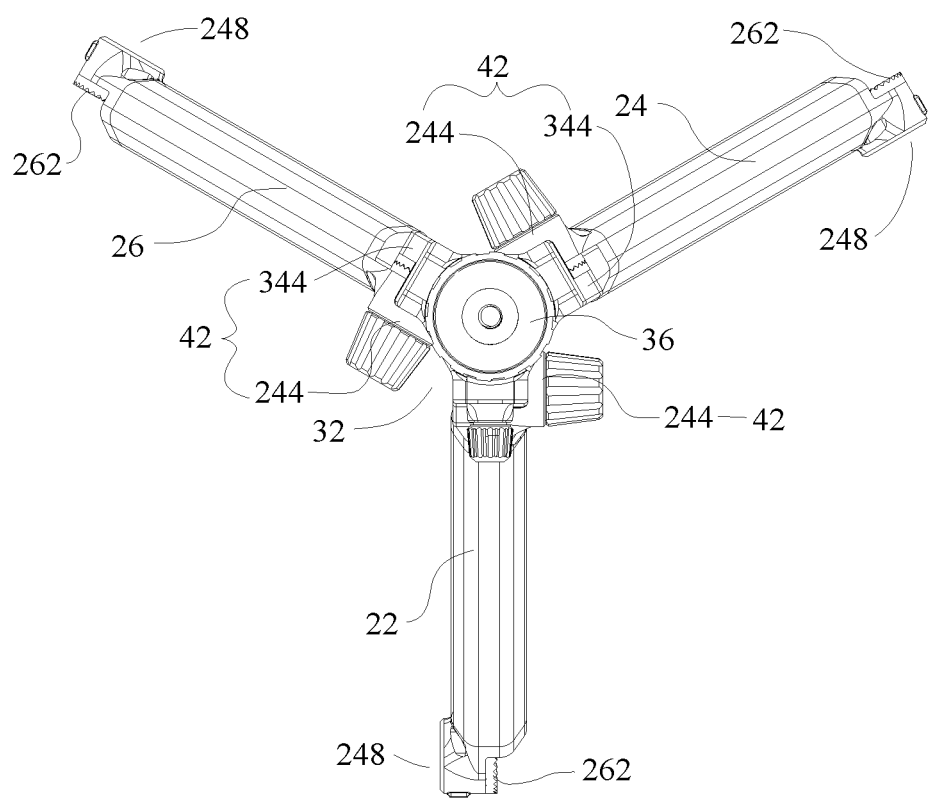
FIG. 3 is a top view of a tripod configuration.
Figure 5:
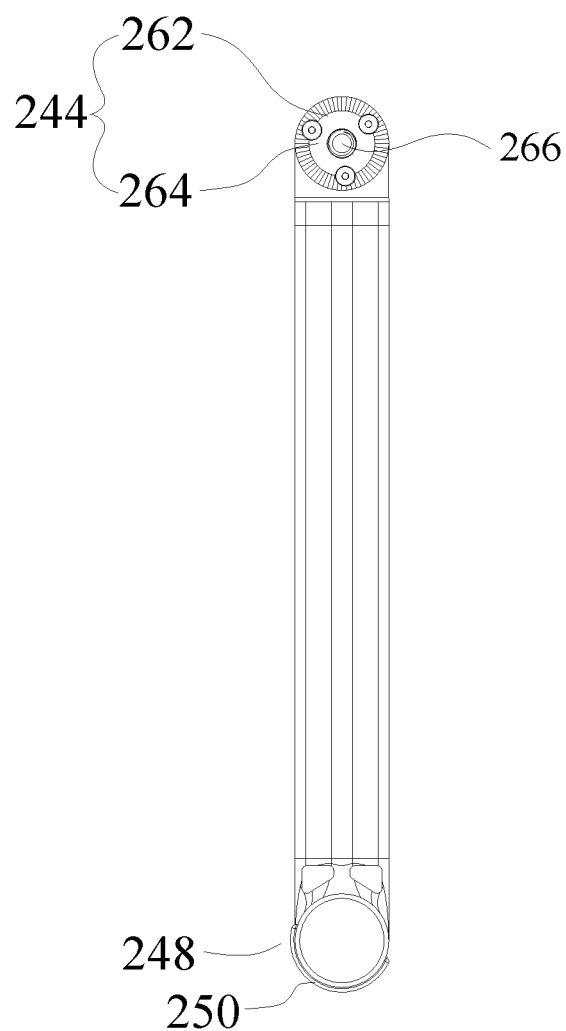
FIG. 5 is an isolated sideview of an exemplary arm segment
Figure 6:
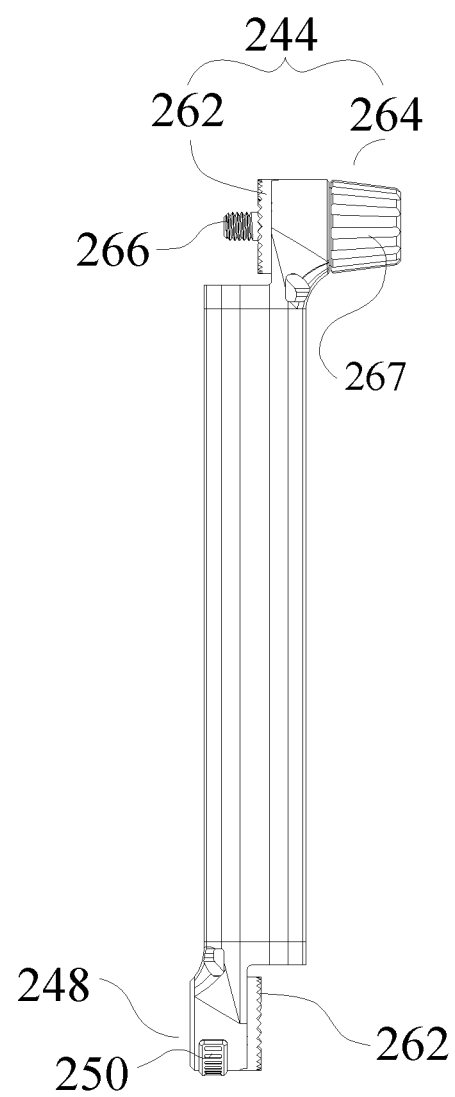
FIG. 6 is an isolated front view of an arm segment.

FIG. 1-3 show a tripod-arm in a tripod configuration (14). First (22), second (24), and third (26) arm segments are coupled with a mount (32). The arms segments (22, 24, 26) are substantially the same length. Each arm segment comprises a male coupling element (244) on one end, and a female coupling element (248) on the opposing end (FIG. 5-6). The mount (32) comprises three base coupling elements (344) extending downward. The leg segments' (22, 24, 26) male coupling elements (244) operatively couple with the base coupling elements (344) to form the tripod configuration (14). The female coupling element (248) serves as a tripod foot—an outer portion of the female coupling element configured to contact a surface and form a stable base. The exemplary female coupling elements (248) contain a foot (250), a layer on outer edge intended to contact a surface. The foot (250) may be tactile or ribbed to increase stability and shock absorption. Rubber or other pliable material may also improve stability when contacting some surfaces. The feet (250) may comprise spike-type components, to allow penetration and greater stability when placed on a pliant surface.

Figure 4:
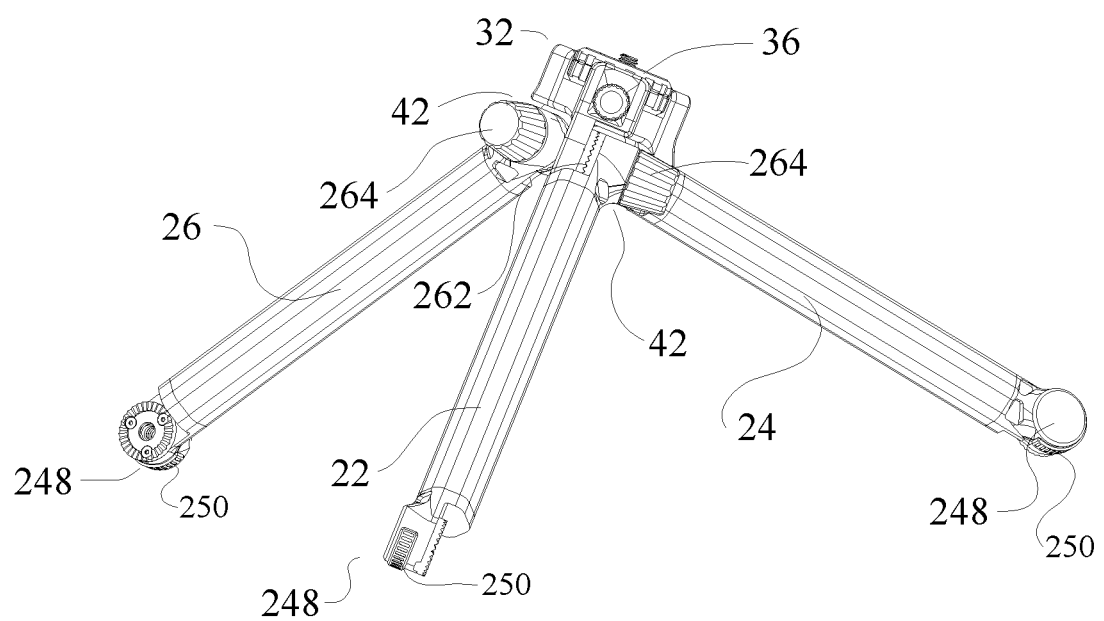
FIG. 4 is a side view of a tripod configuration with a second arm segment adjusted outward.

The exemplary arm segments (22, 24, 26) all comprise the components seen in FIGS. 5-6. When coupled, the male coupling element (244) and base coupling element (344) form base joints (42). The base joint (42) permit movement of the arm segment (22, 24, 26) and the mount (32) relative to each other. The arm segment end opposing the joint (42), the female coupling element (248), may be rotated relatively towards or away from the other arm segments in the tripod configuration (14). FIG. 4 shows the second arm segment (24) rotated away from the other two arm segments (22, 26). Adjustment of the arm segments (22, 24, 26) enables the tripod to stand on uneven surfaces and allows change of the camera angle and vantage point.

Figure 7:
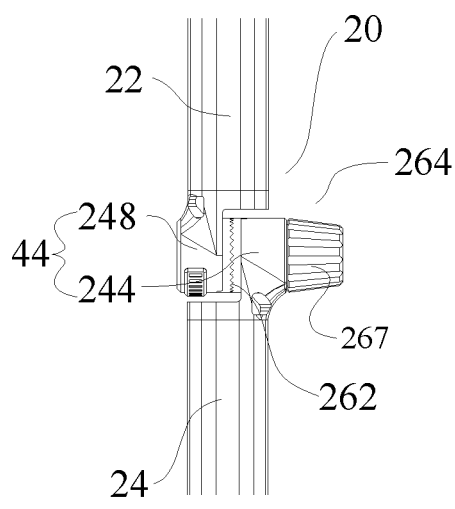
FIG. 7 is an enlarged view of an arm joint in a locked position.
Figure 8:
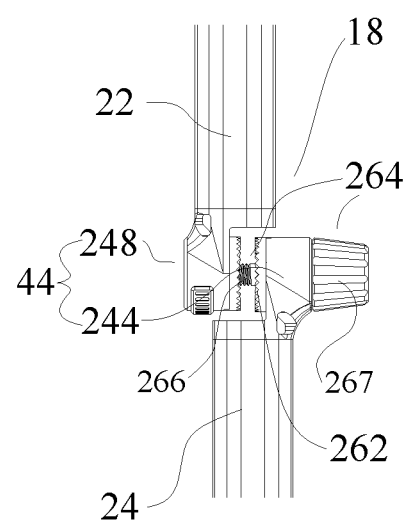
FIG. 8 is an enlarged view of an arm joint in an adjustment position.

The exemplary joints (42) comprise concentric rosettes. The exemplary male coupling element (244) and the base coupling element (344) form the rosette. The male coupling element (244) is comprised of a thumb screw (264) and serrated face (262). The thumb screw (264) is comprised of a knob (267) and threaded aspects (266) (FIGS. 7-8). The threaded aspect (266) of the thumb screw (264) penetrates an opening in the arm segment (22, 24, 26) perpendicular to the surface of the serrated face (262). The opening is located within the serrated face (262). The base coupling element (344) has a serrated face (262) corresponding to the male coupling element (244) serrated face (262). The base coupling element (344) has a threaded socket (265) corresponding to the threaded aspect (266) of the thumbscrew (264). The threaded socket (265) penetrates the base coupling element (344) through the serrated face (262), and may pass completely or partially through the base coupling element (344). The thumb screw (264) is installed into the socket (265) to achieve coupling.

The joint (42) is locked into position when the serrated faces are engaged in a locked position (20; FIG. 7). A locked position is achieved by inserting the thumbscrew (264) into the socket (265) until ridges on the serrated faces (262) abut, preventing further rotation (FIG. 7). In this embodiment the thumbscrew is inserted by rotating, i.e. tightening. An adjustment position (18; FIG. 8) enables rotation of the leg segment relative to the base coupling element 344. The adjustment position (18) is achieved when thumbscrew (264) is coupled with the socket (265) but inserted so the serrated faces (262) do not engage. The threaded aspect (266) of the thumbscrew (264) serves as a pivot around which the leg segment (22, 24, 26) and mount (32) can rotate. When the desired orientation is achieved the thumbscrew (264) is tightened until the joint (42) is locked.

All three leg segments (22, 24, 26) can be detached from the mount (32) by removing the threaded aspect (266) of the thumb screw from the socket. To create an arm configuration (16) the second (24) and third (26) arm segments are disengaged from the base coupling elements (344). The male coupling element (244) of the second arm segment (24) couples with the female coupling element (248) on the first arm segment (22), creating a first joint (44). The male coupling element (244) on the third arm segment (26) couples with the female coupling element (248) on the second arm segment (24), creating a second joint (46). The male coupling element (244) of the first arm segment (22) remains coupled with base coupling element (344), forming a base joint (42), as in the tripod configuration (14).

The exemplary female coupling elements (248) comprise aspects like the base coupling elements (344). A threaded socket (265) corresponding to the threaded aspect (266) of the thumbscrew (264) penetrates a concentric serrated face (262). The socket (265) may completely, or partially penetrate the leg segment (22, 24, 26). The exemplary joints are limited to one degree of freedom around the axis created by the threaded aspect (266) and the socket (265). Other joints may use coupling methods permitting multiple degrees of freedom. A male coupling element may comprise a ball and a female coupling element a socket. Ball-heads, as known in the art, permit multiple degrees of freedom. In an adjustment position, the ball-head would be capable of movement within the socket. A locked position may be achieved by a thumb screw or other locking mechanism configured to enable the user to apply fixed pressure on the ball, locking it in a specific orientation.

The thumbscrew (264) is installed into the socket (265) to couple the male (244) and female (248) coupling elements and form the first (44) and second (46) joints. The exemplary joints (44, 46) function as rosettes. The joints (44, 46) are in an adjustment position (18) when the thumbscrew (264) is inserted into the socket (265) and the serrated faces (262) do not engage (FIG. 8). The two coupled legs (22, 24, 26) can rotate relative to each other in the adjustment position (18). The exemplary joints (44, 46) enable each leg to rotate around the axis created by the threaded aspect (266) and the socket (265).

Figure 9:
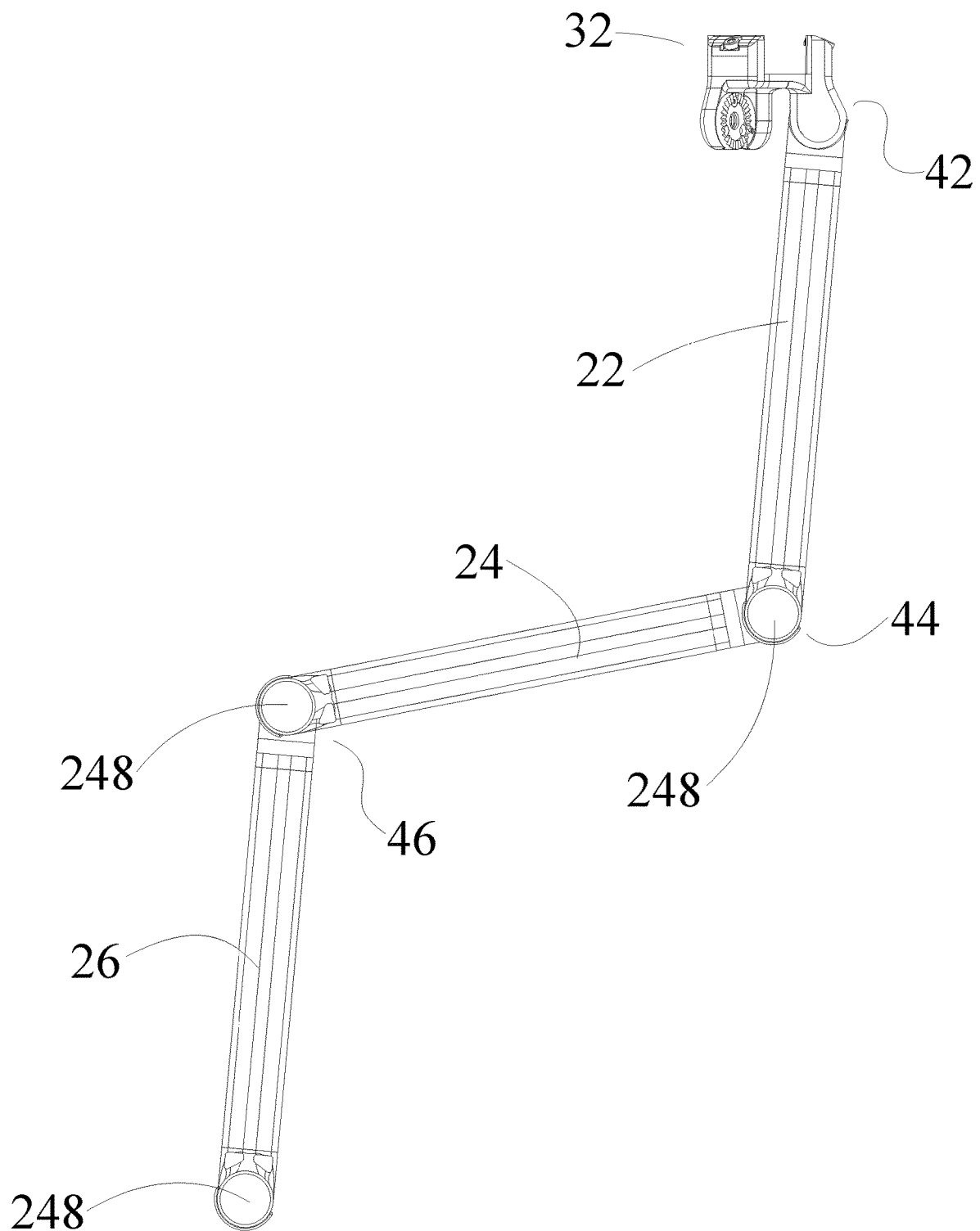
FIG. 9 is a sideview of an arm configuration from the side on which the female coupling elements are disposed.
Figure 10:
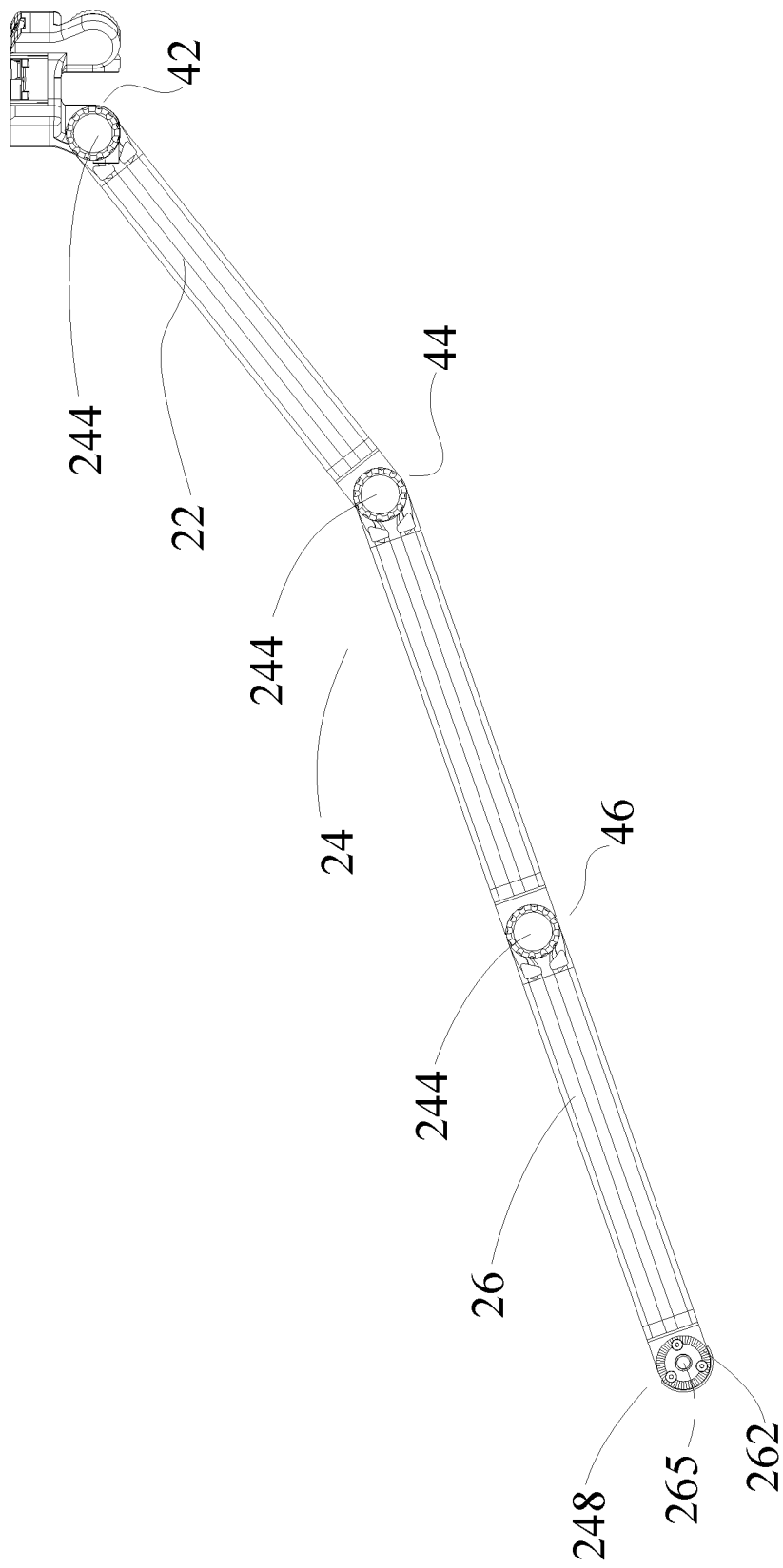
FIG. 10 is a sideview of an arm configuration from the side on which the male coupling elements are disposed.

A locked position (20) is achieved by tightening the thumbscrew (264) until the serrated faces (262) engage and abut (FIG. 7). Ridges on the serrated faces (262) prevent further rotation. The knob aspect (267) of the thumbscrew (264) exerts pressure on the arm segment to lock the serrated faces 262 together. Arm segments (22, 24, 26) and the mount (32) are adjusted in the adjustment position (18). When the desired orientation is realized, the knob aspect (267) is turned to lock the joint (42, 44, 46) in place. The arm segments (22, 24, 26) can be rotated and the joints (42, 44, 46) locked at the orientation desired by the user (see FIGS. 9 and 10).

The third arm segment (26) will typically be utilized as the handgrip in the arm configuration (18) because it allows greatest extension. The third arm segment (26) will typically be used as the handgrip of the arm configuration (16).

In the exemplary embodiment the arm segments are interchangeable; each segment may serve as either the first (22), second (24), or third arm segment (24), as shown and discussed. One arm segment may be configured uniquely to better perform the handgrip function of the third arm segment (26). Such an arm my comprise a grip surface (27). The grip surface (27) may be comprised of a pliant material, such as thermoplastic elastomer or other elastic material. Such a handgrip (25) may be relatively thicker to enhance gripping ability. The handgrip (25) may have a soft outer surface, made of a material such as rubber. The female coupling aspect (248) may be eliminated from a handgrip segment, as it would be used in neither the tripod (14) nor arm (16) configurations.

Exemplary arm segments (22, 24, 26) are 19 cm long. The exemplary arm segments are hexagonal prisms, with a long diagonal of 2 cm. The arm segments may have any shape or dimensions capable of being held in a human hand. Arm segments may be constructed of carbon fiber, aluminum, plastic, or other durable material.

Thumbscrews (264) may be permanently coupled with the arm segments (22, 24, 26). An e-clip or o-ring may be disposed within the arm segment and configured to keep the threaded coupling aspect (266) of the thumbscrew (267) from detaching. While coupled with the female coupling element (248) the thumbscrew (264) remains capable of the motion range relative to the serrated face (262) needed to adjust between the rotation (18) and a locked position (20). The user removes the threaded aspect (266) from the socket (265) to detach the arms (22, 24, 26) from each other, or the base coupling element (344). A spring may also be disposed within the arm segment (22, 24, 26) to augment the locking force of the thumbscrew (264), or otherwise bias the thumbscrew (264).

Figure 11:
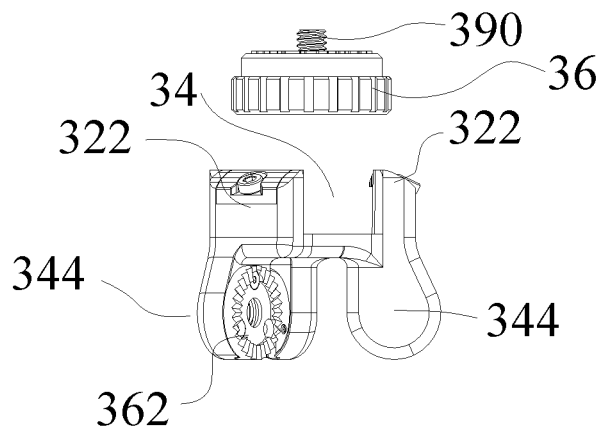
FIG. 11 is an isolated sideview of a mount and a detached plate.
Figure 12:
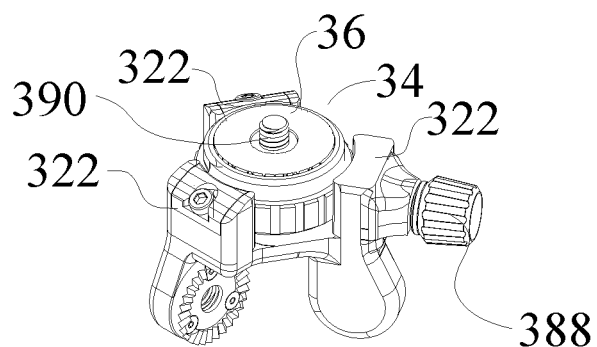
FIG. 12 is an isolated perspective view of the mount and a coupled plate.
Figure 13:
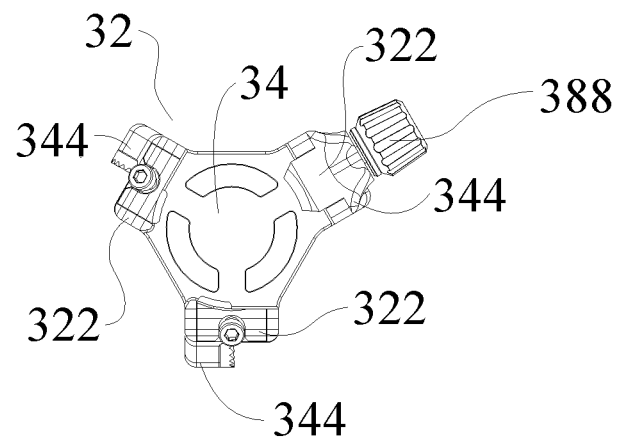
FIG. 13 is an isolated top view of the mount.

FIGS. 11-13 depict the mount (32) in isolation. The mount (32) is configured to either couple a camera directly or by use of auxiliary component. The exemplary mount (32) utilizes an auxiliary plate (36). Sidewalls (322) extend upward at the perimeter of the mount (32). The sidewalls (322) define a receptacle (34) to receive the plate (36). The receptacle (34) comprises plate coupling means. A plate screw (388) is the exemplary plate coupling means. The plate screw (388) is turned to clamp the plate within the receptacle (34). The exemplary plate is cylindrical with a diameter of 35 mm. Various methods may be utilized to couple a plate (36) or other auxiliary coupling device with the mount (32). mount (32) and plate (36) may utilize an Arca-Swiss® quick release or other quick release systems may be utilized.

The plate (36) comprises camera or other device coupling means. A ¼"-20 screw (390) is the exemplary camera coupling means.

Mounts (32) may permit direct coupling of a camera or other device. Such mounts comprise a camera or device coupling means. A ¼" 20 screw may be integrated with a mount to permit direct coupling.

A ballhead configuration is also possible. The mount (32) may be configured as a socket. The auxiliary component may be a ball with camera coupling means attached thereto.

The foregoing disclosure is intended to be illustrative and not limiting the scope of the invention. Merely exemplary embodiments and methods related to the invention are discussed and described. As will be understood by those familiar to the art, the disclosed subject matter may be embodied in other forms or methods without departing from the essence of the invention, which is set forth in the claims.

I claim:

1. A tripod, comprising:
    a. a mount comprising three base coupling elements and device coupling means;
    b. three arm segments, each of the three arm segments comprising a coupling element a male coupling element and a female coupling element;
    c. said coupling elements being configured to couple with the base coupling elements and at least one of the coupling elements on the other two arm segments;
    d. said arm segments and mount comprising a tripod configuration when all three base coupling elements are coupled with the arm segments;
    e. said arm segments comprising an adjustable extension arm configuration when:
        i. a first arm is coupled with a base coupling element, creating a base joint;
        ii. a second arm segment is coupled with the coupling element of the first arm opposing the base coupling element, creating a first joint;
        iii. a third arm segment coupling with the coupling element of the second arm segment opposing the first coupling element, creating a second joint;
    f. Said joints being configured to allow rotation of the coupled elements relative to each other when in an adjustment position;
    g. Said joints being configured to lock in a specific orientation when in a locking position.

2. A mounting device, comprising:
    a. a mount comprising three base coupling elements and device coupling means;
    b. first, second, and third arm segments of substantially similar length;
    c. each of said arm segments comprising a male coupling element at one end and a female coupling element on the opposing end;
    d. said male coupling element comprising a thumbscrew;
    e. said male coupling elements configured to couple with the base coupling elements and the female coupling elements;
    f. each of said male coupling elements forming a base joint when coupled with a base coupling element;
    g. said mount and arm segments comprising a tripod when the three male coupling elements couple with the base coupling elements;
    h. said base joints permitting the coupled arm segment and mount to move relative to each other while in an adjustment position;
    i. each of said male coupling elements forming a joint when coupled with a female coupling element;
    j. said joints permitting the coupled arm segments to move relative to each other while in an adjustment position;
    k. said arm segments and mount comprising an adjustable arm when one arm segment is coupled with the mount and another arm segments couples with the female coupling element of said mount coupled arm segment.

3. The mounting device in claim 2, wherein a foot is positioned on each female coupling element, said feet disposed to contact a surface when all the arm segments are coupled with the mount in a tripod configuration.

4. The mounting device in claim 2, wherein the joints are configured to lock a coupled male element and female element in a specific orientation when manipulated into a locking position.

5. The mounting device in claim 2, wherein the device coupling means is a receptacle configured to couple a plate, said plate comprising a threaded screw capable of coupling a camera.

6. An adjustable extension arm, comprising:
    a. three arm segment components, each of said arm segments comprising a male coupling element and a female coupling element;
    b. a mount component comprising three base coupling elements, the mount comprising means of coupling an auxiliary device;

c. said mount and arm segments being modular, the arm segments being capable of coupling with the mount and the other arm segments;
d. said coupling elements forming joints when coupled with each other;
e. said adjustment position enabling movement of the coupled components relative to each other;
f. said locking position enabling the coupled components to be locked in a specific orientation relative to each other;
g. said mount being configured to enable the three arm segment components to be coupled with the mount simultaneously.

7. The adjustable extension arm in claim 6, wherein a thumbscrew is manipulated to alter the joint between the adjustment and locking positions.

8. The adjustable extension arm in claim 6, wherein the male and female coupling elements comprise serrated faces, and the joints comprise modular concentric rosettes capable of rotation relative to each other.

* * * * *